US008896241B2

(12) United States Patent
Wernersbach et al.

(10) Patent No.: US 8,896,241 B2
(45) Date of Patent: Nov. 25, 2014

(54) CONTROLLED MOTION SYSTEM

(71) Applicant: Rockwell Automation, Inc., Milwaukee, WI (US)

(72) Inventors: Glen C. Wernersbach, Cincinnati, OH (US); Keith G. Jacobs, Loveland, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 97 days.

(21) Appl. No.: 13/678,741

(22) Filed: Nov. 16, 2012

(65) Prior Publication Data
US 2013/0119897 A1 May 16, 2013

Related U.S. Application Data

(60) Provisional application No. 61/629,310, filed on Nov. 16, 2011.

(51) Int. Cl.
| H02P 25/06 | (2006.01) |
| H02P 31/00 | (2006.01) |
| B65G 43/00 | (2006.01) |
| B65G 54/02 | (2006.01) |

(52) U.S. Cl.
CPC ............... *H02P 31/00* (2013.01); *B65G 43/00* (2013.01); *B65G 54/02* (2013.01)
USPC .............................................. 318/38; 318/135

(58) Field of Classification Search
USPC .............................................. 318/38, 135, 687
See application file for complete search history.

(56) References Cited

U.S. PATENT DOCUMENTS

| 3,987,734 | A | * | 10/1976 | Horn ........................ 104/88.03 |
| 4,348,618 | A | * | 9/1982 | Nakamura et al. ............ 318/38 |
| 4,689,530 | A | * | 8/1987 | Nakamura et al. ........... 318/135 |
| 4,709,639 | A | * | 12/1987 | Geais ............................ 104/292 |
| 4,744,306 | A | * | 5/1988 | Kunczynski ................. 104/168 |
| 6,876,107 | B2 | * | 4/2005 | Jacobs ....................... 310/12.19 |

* cited by examiner

Primary Examiner — Bentsu Ro
(74) Attorney, Agent, or Firm — Fletcher Yoder, P.C.

(57) ABSTRACT

A controlled motion system having a plurality of movers controlled as they travel along both smart and simple sections of a track. The controlled motion system comprises a control system for controlling the speed of a mover as it travels along a simple section, and permits the pitch or distance between movers to increase or decrease as they travel along a simple section. In a preferred embodiment the controlled motion system includes at least one coupling feature having a driving feature on a simple section for engaging and operably driving a driven feature on each mover such that positive control of each mover is maintained throughout its transition from a smart section to a simple section.

17 Claims, 10 Drawing Sheets

CONTROLLED MOTION SYSTEM

CROSS REFERENCE TO RELATED APPLICATION

The present invention claims benefit of U.S. provisional Patent Application No. 61/629,310, filed Nov. 16, 2011, the disclosure of which is hereby incorporated by reference in its entirety.

BACKGROUND OF THE INVENTION

The present invention relates to controlled motion systems and more particularly, to controlled motion systems capable of independently controlling multiple movers on a track.

Systems incorporating linear motor sections that provide independent control of multiple moving elements have been used in a wide variety of processes (e.g. packaging, assembly automation, processes involving use of machine tools, etc.) and provide the advantage of increasing both the speed and flexibility of the process. Since linear motors employ a moving magnetic field to directly drive the moving element (hereinafter referred to as "movers"), they eliminate or reduce the gear heads, shafts, keys, sprockets, chains and belts often used with traditional rotary motor systems. This reduction of mechanical complexity provides both reduced cost and increased speed capability by virtue of reduced inertia, compliance, damping, friction and wear. This technology also provides greater flexibility than pure rotary motor systems by allowing each individual moving element and its associated tool or payload to be independently servo-controlled along a portion of its path.

Such Systems often comprise both "smart" sections which can independently control the motion of each mover on the section and "simple" sections which drive each mover at the same speed on that section. These simple sections typically employ a rotary axis that drives movers with either a magnetic or mechanical coupling to the mover.

One problem with prior art systems is that it is often difficult to know the position of a mover as it travels along both the smart sections and the simple sections. Further, it is often difficult to speed up or slow down movers as they travel along the entire track as well as changing the pitch (or distance) between movers as they move along the simple sections.

Accordingly, a need exists for a controlled motion system having at least one smart section and at least one simple section, that operates to allow movers to be controlled as they travel along both smart and simple sections, that allows the speed of a mover to increase or decrease as it travels along a simple section, and allows the pitch or distance between movers to increase or decrease as they travel along a simple section.

SUMMARY OF THE INVENTION

The present invention relates to controlled motion systems, which can be employed to control the movement, force and operation of a tool, payload or other items that need to be moved to affect a process. More specifically, to controlled motion systems that can independently control multiple moving elements along at least one section of a track.

One preferred embodiment of the controlled motion system includes a hybrid track that is comprised of "smart" and "simple" sections characterized by a transition zone in which positive control of the mover is maintained throughout the transition. This embodiment preferably includes the ability to merge and divert movers onto multiple paths. The "smart" sections are characterized by the ability to independently control each mover on the smart section. An example of this type of motor is disclosed in U.S. Pat. No. 6,876,107 issued Apr. 5, 2005 to Jacobs. The embodiment also includes a control system which is coupled at least one motor for driving the movers along a simple portion of the track for increasing or decreasing the speed of the movers as they move along the simple section.

In another preferred embodiment soft magnetic composite materials are used for the motor core of the controlled motion system. This advantageously allows nonlinear shaped smart sections with complex core geometries to be utilized without the large core losses of prior art systems. Also, soft magnetic composite cores allow the windings to be directly wound onto the core pole pieces and then assembled into the motor core, reducing assembly costs.

In another preferred embodiment, single-sided, fully constrained movers are disclosed that allow an arbitrary load on the mover and further allowing the track to be mounted in an arbitrary orientation.

In a preferred embodiment of the invention the controlled motion system includes a control system which is coupled at more than one motor for driving the movers along more than one simple sections of the track and for increasing or decreasing the speed of the movers as they travel along the simple section(s).

In another preferred embodiment of the invention the control system operates to track the position of a mover traveling along a simple portion track.

In another preferred embodiment of the invention the control system includes means for updating the position of a mover traveling along a simple section and means for adjusting the position of the mover relative to other movers traveling along the track.

In another preferred embodiment of the invention the control system operates to start and stop a mover on a simple section without changing the position of other movers on another sections.

In another preferred embodiment of the invention the speed of a mover on one simple section can be varied so it changes the pitch between the mover and a mover on another section of the track.

In another preferred embodiment of the invention the control system operates to stop a mover from traveling along a simple section such that movers line up allowing the control system to operate the simple sections to move the movers in sync.

In another preferred embodiment of the invention the controlled motion system comprises at least one coupling feature having a driving feature on at least one simple section for engaging and operably driving a driven feature on each mover such that positive control of each mover is maintained throughout its transition from a smart section to a simple section.

In another preferred embodiment of the invention the controlled motion system includes at least one smart section and the at least one simple section arranged to create multiple paths so that movers can be independently diverted or merged onto at least one said multiple paths.

In another preferred embodiment of the invention the controlled motion system includes at least one nonlinear smart section having a nonlinear shaped stator comprising a nonlinear shaped core having a plurality of pole pieces and coils wound around each of the pole pieces and shaped to create a curved shape and wherein the pole pieces are formed from soft magnetic composite materials.

In another preferred embodiment of the invention the controlled motion system includes a control system connected to the Internet for facilitating remote control of the controlled motion system.

Other advantages, objects, and embodiments of the invention will be apparent from the following description, the accompanying drawings and the appended claims.

BRIEF DESCRIPTION OF THE DRAWINGS

The foregoing and other aspects of the invention are discussed in greater detail below with reference to the drawings, provided for the purpose of description and not limitation, where like objects are referenced by like reference numbers, and wherein.

BEST MODE FOR CARRYING OUT THE INVENTION

Figure 1:
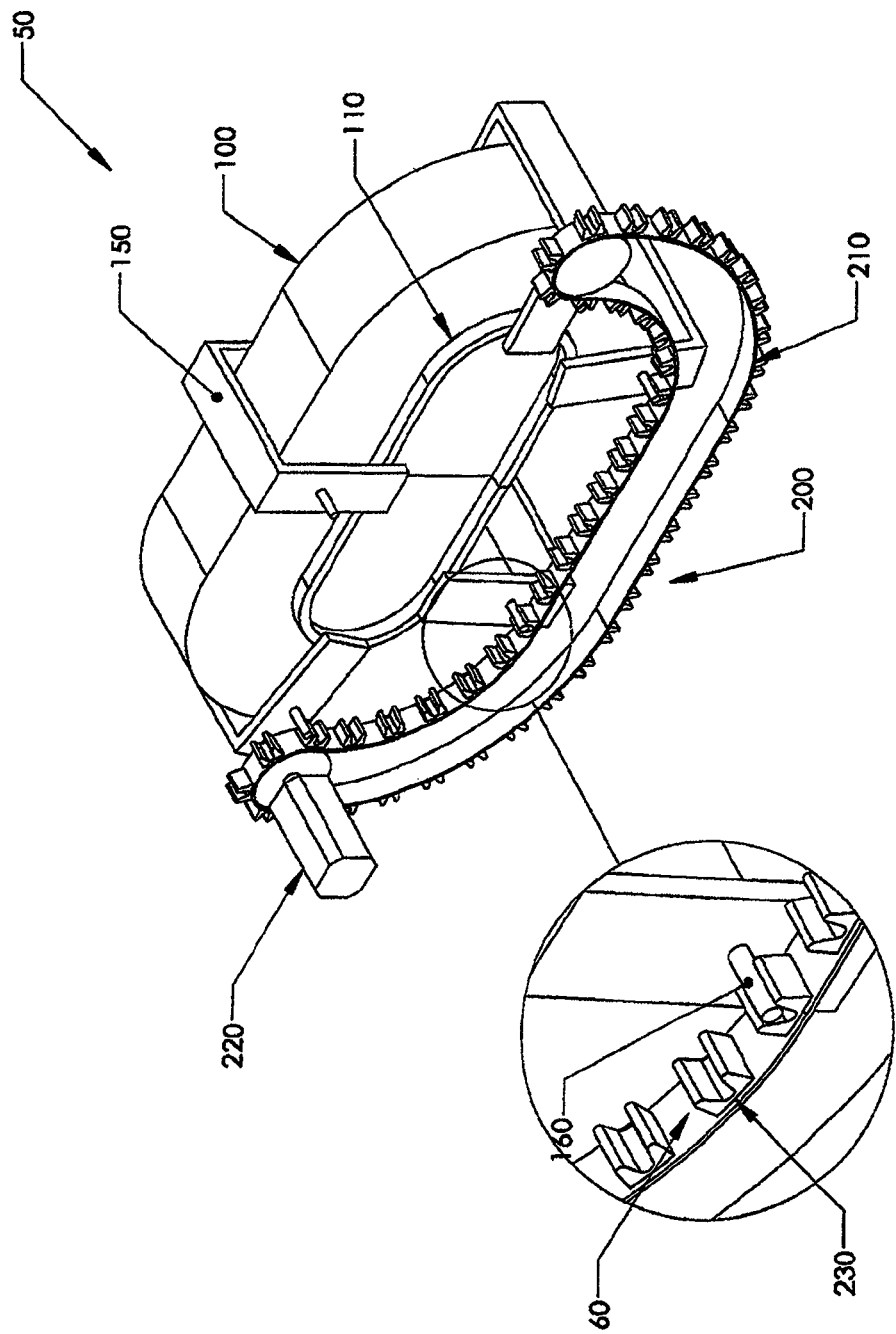
FIG. 1 illustrates a perspective view of a hybrid track having at least one smart section and at least one simple section according to the present invention, utilizing a belt drive for at least one simple section.

FIG. 1 illustrates a preferred embodiment a controlled motion system 10 having of a hybrid track 50, comprised of at least one "smart" section 100 and at least one "simple" section 200. Movers 150 are movably mounted on bearing system 110 such that the movers are constrained to transverse a path defined by this bearing system 110. A "smart" section 100 is characterized by its ability to independently control each of the movers 150 that is in its realm of control. This type of motor section is known and disclosed in U.S. Pat. No. 6,876,107. In contrast, a "simple" section 200 typically lacks the ability to independently control each of the movers 150 but instead moves all of the movers traveling along that simple section 200 together.

In a preferred embodiment as shown in FIG. 1, the simple section 200 comprises a belt or chain 210 driven by a wheeled, chained, linear or rotary motor 220. The belt or chain 210 has at least one driving feature 230 that couples to a driven feature 160 on the movers 150 so that movers 150 can be driven along the simple section 200. In the illustrated embodiment, the driven feature 160 comprises a pin on the mover and the driving feature 230 comprises a complementary lug on the belt 210. The driving feature 230 and driven feature 160 are collectively referred to as the coupling feature 60. In alternative embodiment, a different coupling feature 60 is employed, utilizing a magnet for the driving feature 230 and metal lug mounted on the mover 150 for the driven feature 160. Other types of coupling features could be employed and are within the scope of this invention.

Figure 2:
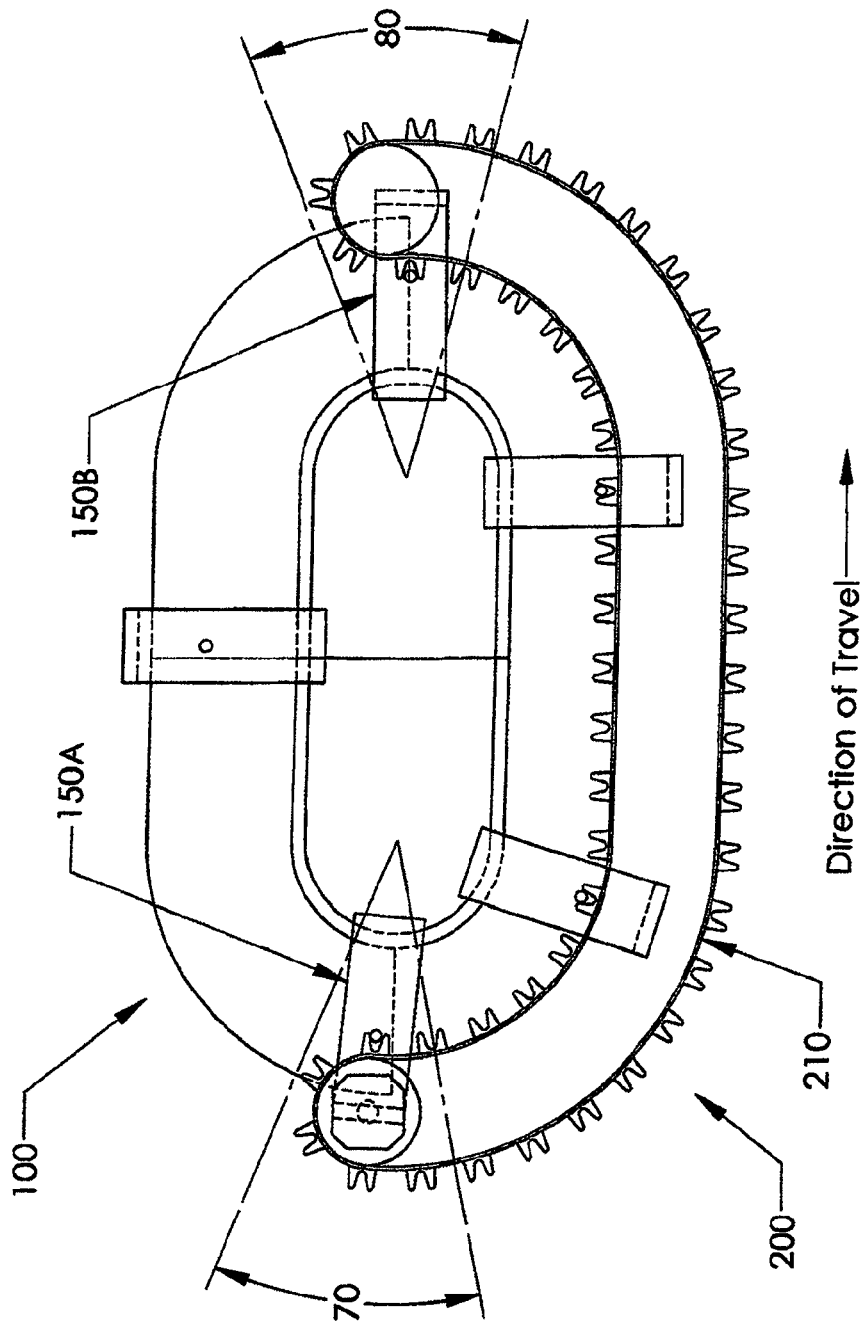
FIG. 2 presents a side view of the hybrid track of FIG. 1, highlighting the transition zones between the smart and simple sections.

Referring to FIG. 2, mover 150A is shown in a transition zone 70 between a smart section 100 and a simple section 200. While in transition zone 70, driving feature 230 engages the driven feature 160 on mover 150A while it is still being driven by the smart section 100 so that the transition onto the simple section 200 is done under positive control at all points in transition zone 70. The belt 210 then drives each mover 150 on the simple section 200 around to the next transition zone 80. In this transition, the smart section 100 engages the mover 150B while it is still under the control of the simple section 200 to once again ensure a transition with positive control at all times. The transition zones 70 and 80 between the smart sections 100 and simple sections 200 are characterized by positive control of movers 150 at all points in the transition so that movers 150 can never be stuck or stranded in transition zones 70 or 80.

Figure 3:
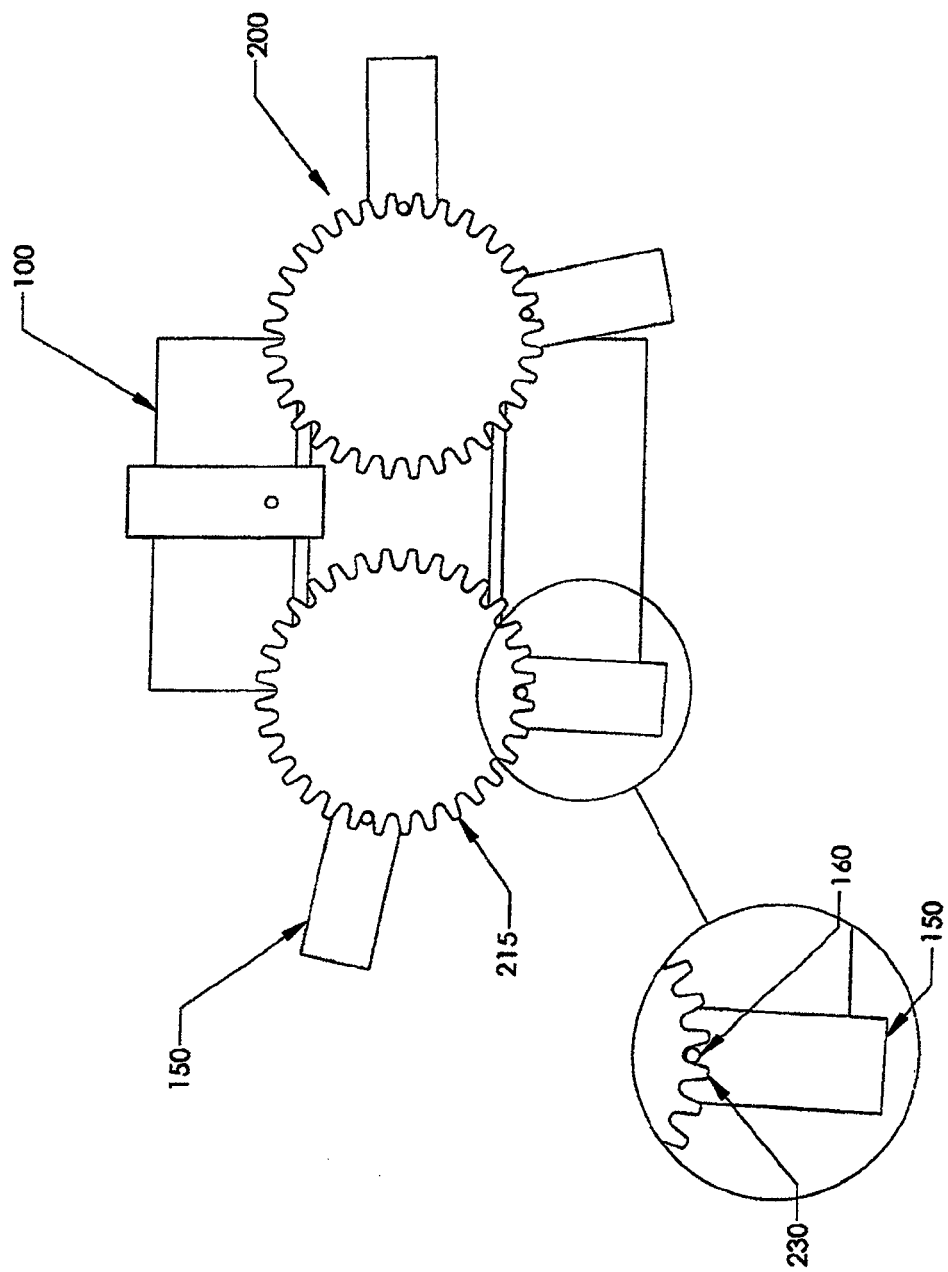
FIG. 3 presents a side view of another preferred embodiment of the hybrid track which utilizes sprockets for the driving feature in one simple section.

FIG. 3 illustrates another preferred embodiment of the present invention. In this embodiment, a sprocket 215 is mounted on each end of the track and acts as the drive mechanism for the simple section 200. As before, smart section 100 provides independent control of the movers 150. In a transition zone, driving feature 230, which is operably associated with sprocket 215, engages driven feature 160 to provide positive control at all points in the transition.

Figure 4:
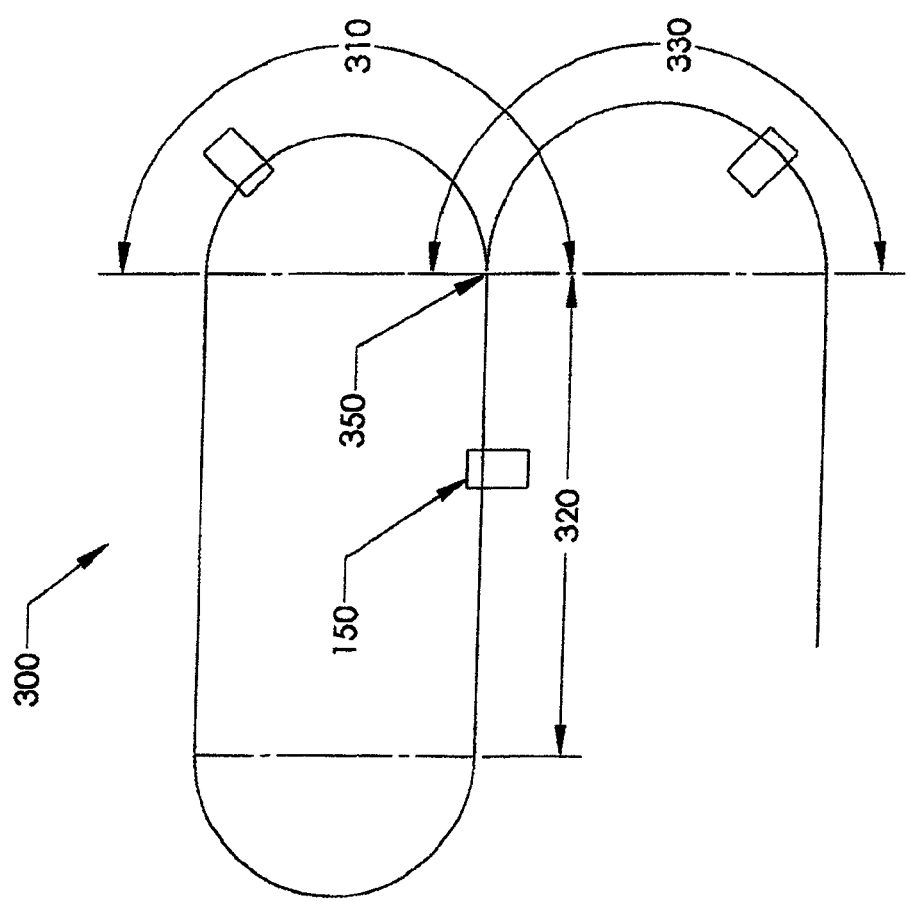
FIG. 4 illustrates a hybrid track with multiple paths and at least one switching element to divert movers onto from one path to another.

FIG. 4 presents another preferred embodiment in which the hybrid track sections are arranged to create multiple paths so that movers can be independently diverted or merged onto at least one of these multiple paths. In this embodiment, a track 300 is comprised of at least three path segments, denoted 310, 320 and 330. These path segments can be comprised of any combination of smart and simple sections, as needs. Mover 150 is mounted for motion on track 300. As mover 150 travels along path segment 320 and approaches the junction of path segments 310, 320 and 330, a switching element 350 can activate to switch mover 150 from first path segment 320 onto either second path segment 310 or onto a third path segment 330. Obviously, mover 150 can return to the first path segment 320 by reversing its course. The location of switching element 350 is arbitrary and can be placed anywhere on a path, such in between smart sections, in between simple sections or in between smart and simple sections.

Figure 5:
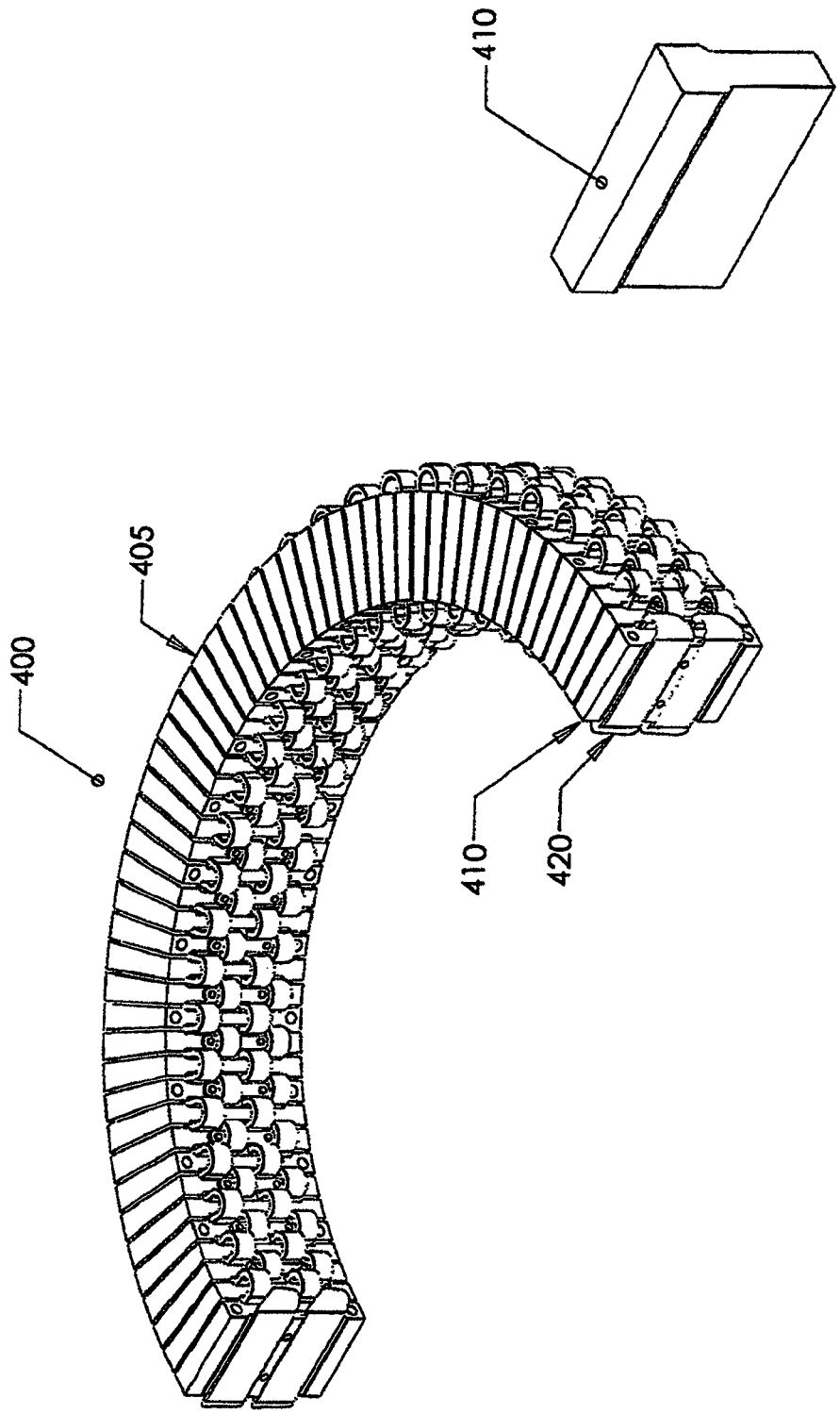
FIG. 5 illustrates a nonlinear shaped motor core fabricated from complex geometry, soft magnetic composite pole pieces according to a preferred embodiment of the present invention.

FIG. 5 illustrates another preferred embodiment of the present invention. In this embodiment, nonlinear smart section 100 employs a nonlinear shaped stator 400 that is comprised of a nonlinear shaped core 405. Said core 405 is further comprised of a plurality of pole pieces 410. Coils 420 are wound around each of said pole pieces 410. In the illustrated embodiment, the pole pieces 410 are wedge shaped to create a curved shape for stator 400. However, pole pieces 410 are not limited to the wedge shape depicted and could be of any arbitrary geometry to create any arbitrary shape for core 405.

While it is known in the art to stack laminated electrical steel to create a core for a motor or generator, doing so for an arbitrary shape, such as pole piece 410, is expensive to manufacture. The present invention overcomes this problem by utilizing Soft Magnetic Composite (SMC) materials to fabricate pole piece 410. SMC's are insulation-coated, ferrous, powder metal materials that can be molded to net shape or near net shape components. SMC materials are commercially available from Hogan as SA and other sources. In an alternative embodiment, the entire core 405 could be manufactured as a single piece.

In a preferred embodiment, the coil 420 is wound directly onto pole piece 410. This advantageously eliminates the need to insert coil 420 after core 405 is assembled, reducing cost and time. This could be advantageous even for a traditional core that is currently laminated because it eliminates the cost and time to insert the windings.

In another preferred embodiment, core 405 comprises SMC pole piece 410 and is insulated from coil 420 with an epoxy coating, such as those commercially available from 3M™ under the trade name Scotchcast™ Powder Epoxy Coatings. Alternatively, a lining material such as Dupont Nomex or DMD could be utilized to provide an insulator between pole piece 410 and coil 420.

Figure 6:
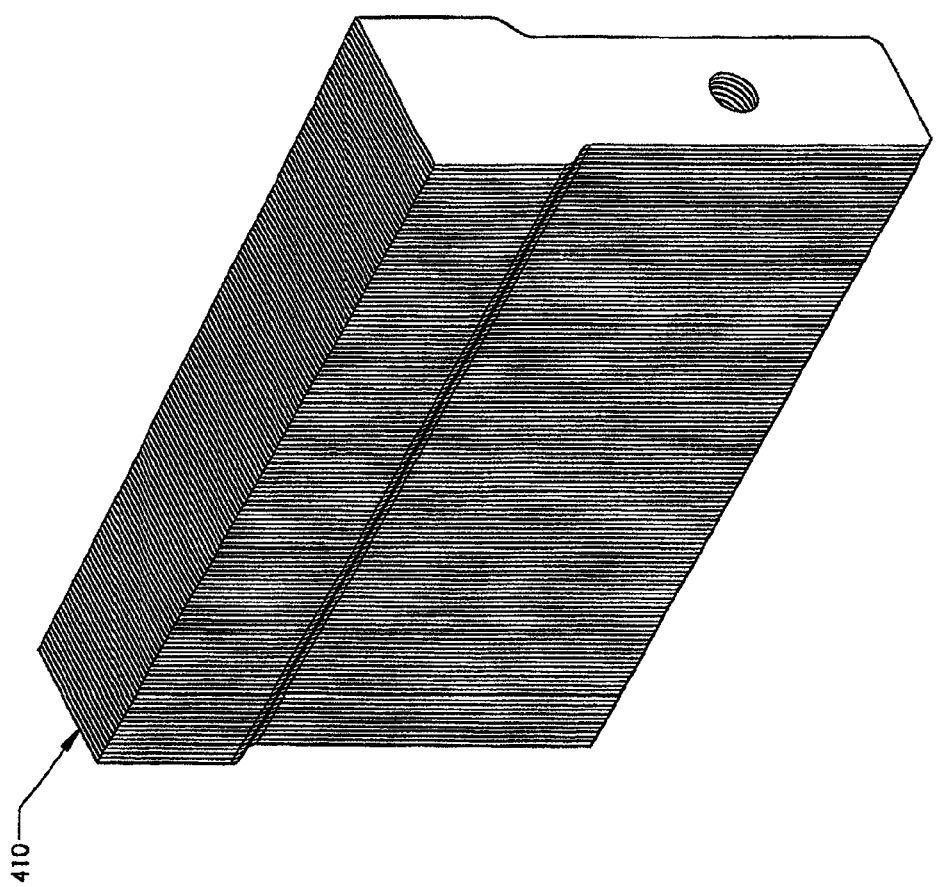
FIG. 6 illustrates a wedge-shaped laminated pole piece for use in a nonlinear shaped core according to an alternative embodiment.

In an alternative embodiment, as illustrated in FIG. 6, pole piece 410 is fabricated from a stack of laminated sheets and then machined to the desired geometry. As mentioned above, this is less desirable than using SMC, but it is still a technically viable approach.

Figure 7:
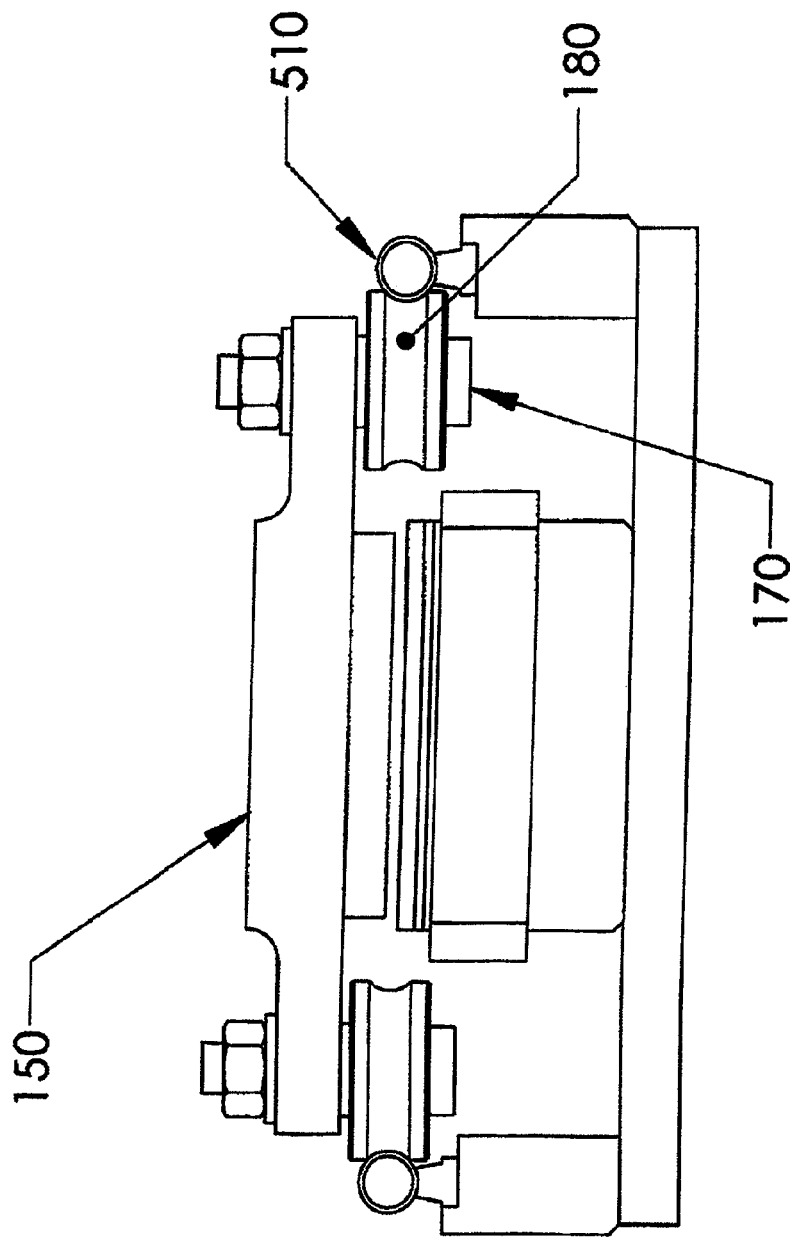
FIG. 7 illustrates a single-sided mover that is fully constrained by its bearing system against a load from all directions except for the direction of motion according to a preferred embodiment of the present invention.

FIG. 7 illustrates a preferred embodiment of the present invention. In this embodiment, a single-sided mover 150 is mounted for motion on a bearing rail 510 with bearings 170 that fully constrains the mover against loads from any direction, except for the direction of motion along the track. Mathematically, this is defined as being constrained in 5 of the 6 degrees of freedom for a free body. A preferred embodiment of bearings 170 are concave track rollers 180 running on a round rail 510 as illustrated in FIG. 7. Other embodiments utilizing other rolling bearing elements, air bearings or magnetic bearing could be employed and are included within the scope of this invention.

Figure 8:
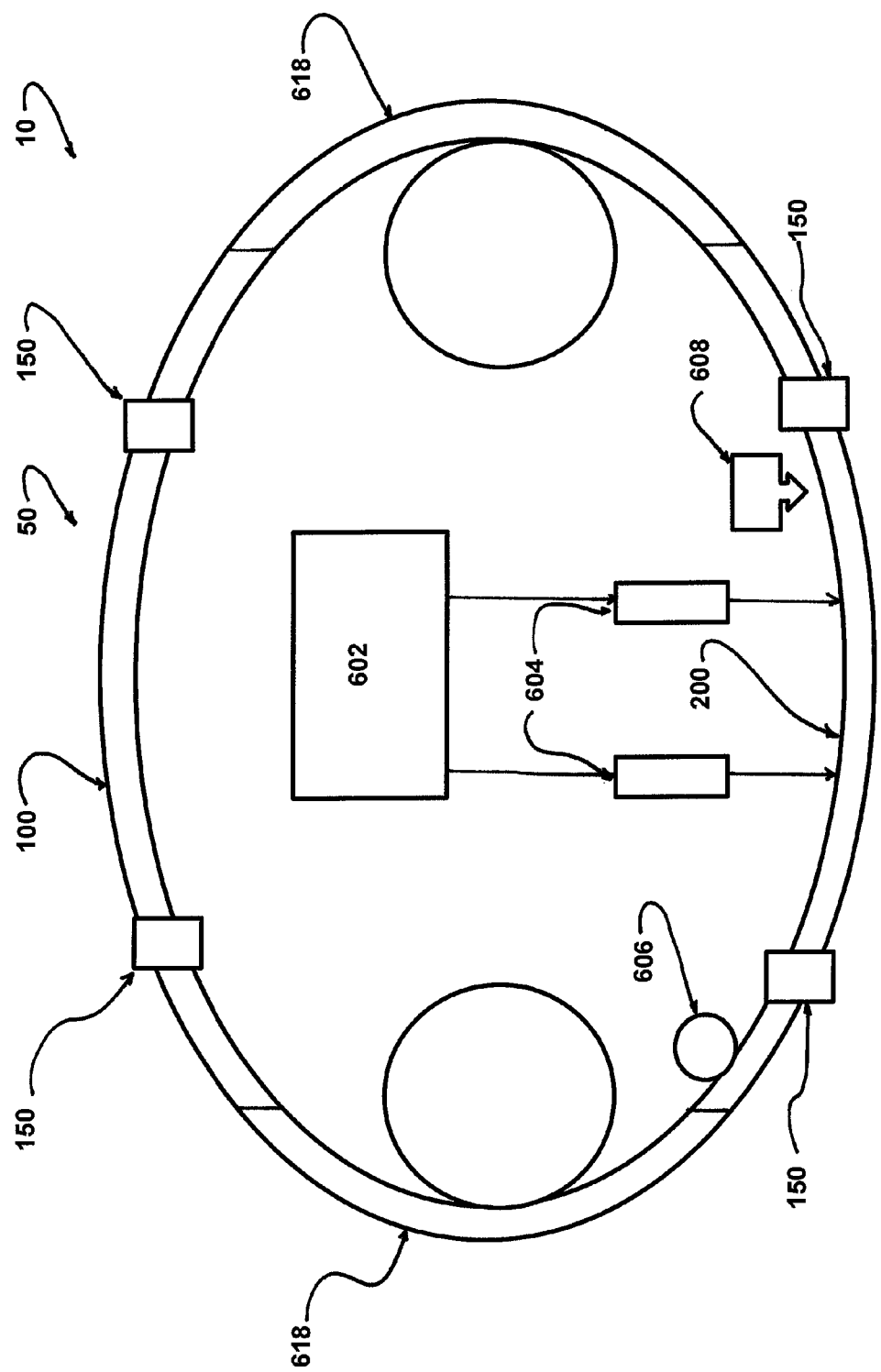
FIG. 8 is a schematic representation illustrating the general methodology of a preferred embodiment of the controlled motion system having a hybrid track with at least one smart section and at least one simple section and a control system for driving movers along the at least one simple section.

Referring to FIG. 8 a schematic representation illustrating the general methodology of a preferred embodiment of the controlled motion system 10 of the subject application having a control system 602. It should be understood that the control system 602 can be used with controlled motion tracks, including those shown in FIGS. 1 and 2. As illustrated, in a preferred embodiment hybrid track 50 includes at least one smart section 100 and at least one simple section 200 connected together such that movers 150 can travel along one or more of the smart sections 100 and along one or more of the simple sections 200. The movers 150 are mechanically coupled to wheeled, chained, or linear motors 604 for driving the movers 150 along the simple sections 200. Preferably, the motors 604 are electronically coupled to the control system 602 that operates to control the speed of the motors 604. It should be understood that controlling the speed of the motors 604 operates to create a virtual axis motion profile whereby the speed of the mover 150 traveling along the track 50 in relation to the time of travel permits the position of individual movers 150 to be tracked by the control system 602. It should now be apparent that by tracking the position of the mover 150 as it travels along a simple section 200 by controlling its speed of the motor 604 reduces or eliminates the need for an encoder for the entire circumference of the simple sections 200 thereby significantly reducing the cost and complexity of the system 10. It should be understood however that in another preferred embodiment the controlled motion system 10 includes one or more encoders 606 on the simple sections 200 for accurately tracking the position of the mover 150 along the entire track 50.

In another preferred embodiment of the invention the controlled motion system 10 comprises at least one photo eye 608 positioned along one or more of the sections of the track 50 and each are electronically coupled to the control system 602 and operate to accurately update the position of the virtual axis at any know point along the simple section 200 thus verifying the position of the movers 150 traveling along the simple section 200. It should now be apparent to one skilled in the art that the use of a photo eye 608 as described allows for a relatively inexpensive way to resynchronize a mover 150 traveling from a simple section 200 to a smart section 100.

In another preferred embodiment of the invention the control system 602 operates to stop or start the movement of the movers 150 traveling along one or more of the simple sections 200, by starting and stopping the operation of the motors 604. The controlled starting and stopping of the movers 150 along the simple sections 200 allows movers 150 to move from a smart section 100 to a simple section 200 (usually a curve) without having to change the mover position on other simple sections. It should also now be understood that by stopping the motor 604 and allowing the wheel or chain section 610 to push movers 150 such that they line up one right next to another which allows the movers 150 to be positioned there until the control system 602 operates to activate the motors 604 moving the movers 150 in sync.

Figure 9:
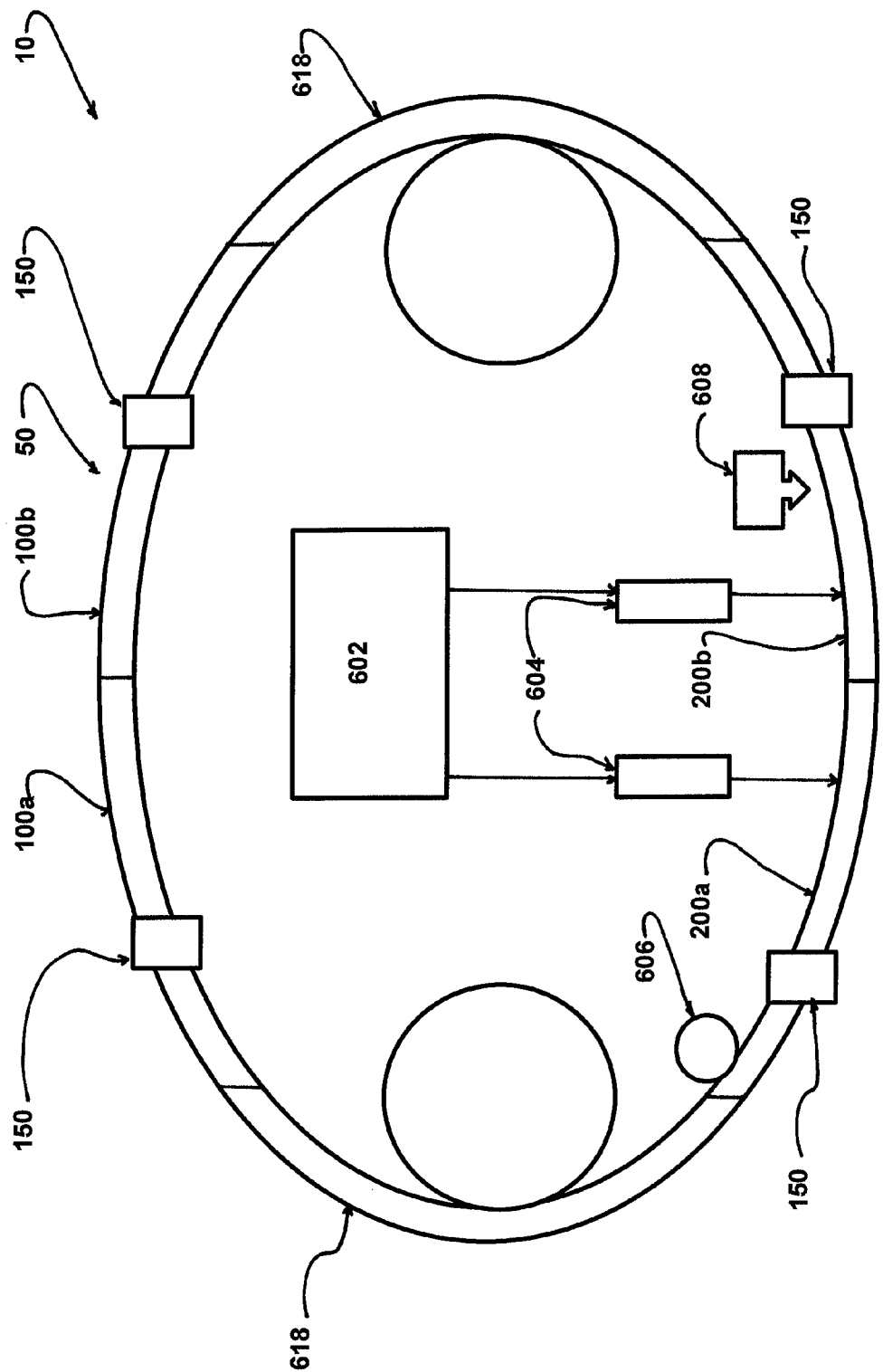
FIG. 9 is a schematic representation illustrating the general methodology of a preferred embodiment of the controlled motion system having a hybrid track with at least one smart section and at least two simple sections and a control system that operates to change the pitch between movers traveling along the at least two simple sections.

As shown in FIG. 9, another preferred embodiment of the invention is shown having a hybrid track 50 comprising two or more simple sections 200 each having a motor 604 or other form of speed control such that speed of a mover 150 traveling from one simple section 200a to another simple section 200b changes. It should now be apparent that by changing the speed from one simple section 200a to another simple section 200b operates to increase or decrease the pitch between movers 150 as they travel from one simple section 200a having one speed to another simple section 200b having another speed. In operation, by reducing the speed of motor 604a of the first simple section 200a relative to the speed of the motor 604b of the second simple section 200b results in increasing the pitch or distance between movers. It should be understood that the control system operates to monitor the locations and speeds of each mover traveling along the track and adjusts the speed of the movers to maintain their relative positions to each other in accordance with the preprogrammed operating parameters for the system. It should also be understood that in a preferred embodiment of the invention the control motion system operates by adjusting the speed and/or operation of one or more motors moving one or more movers for adjusting the speed and/or pitch of the movers as they travel along one or more simple sections of a control motion track.

Figure 10:
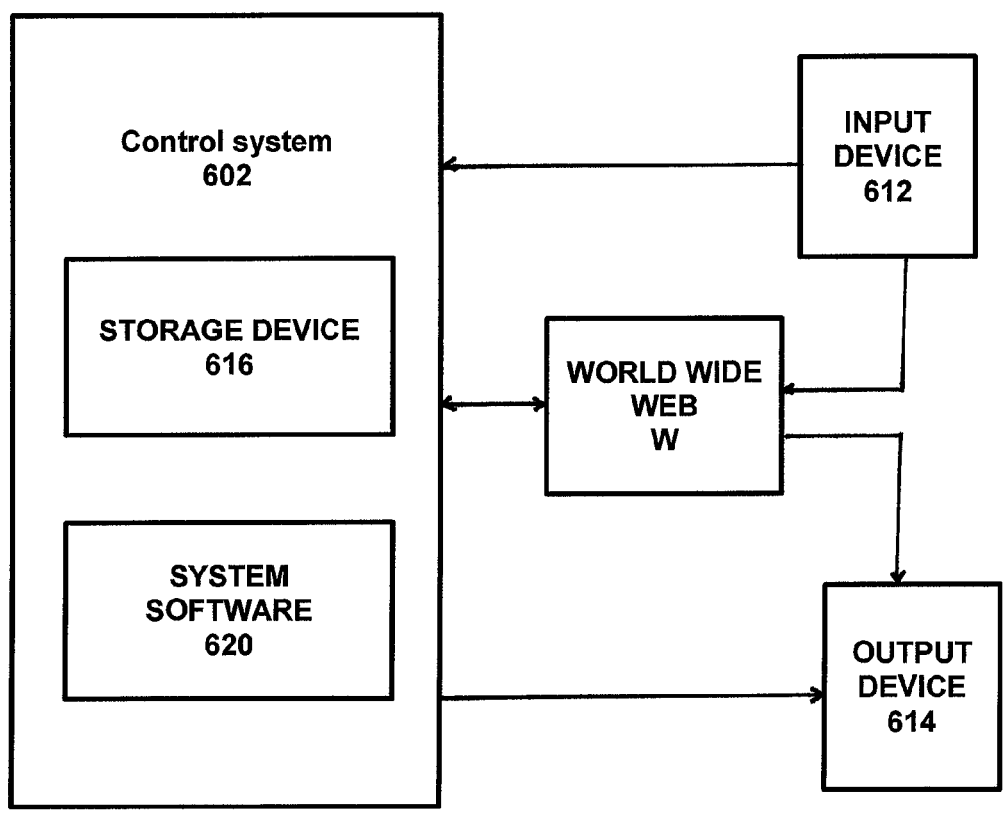
FIG. 10 is a schematic representation illustrating a control system for controlling the operation of the controlled motion system of the subject invention having am input device, an output device, a data storage device, and coupled to the World Wide Web.

Referring to FIG. 10, in a preferred embodiment of the invention, the control system 602 is a processor or computer having a suitable input device 612, like a keypad, touch screen, or any other suitable input device that can accept information or instructions from an operator (including operating parameters, instructions directing movement or controlling the direction or path of a mover during operation); one or more suitable output devices 614, such as a computer display, printer, image-forming or display device, and the like; and a data storage device 616 such as any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data. It should be understood that the control system 602 can include any combination of the above components, or any number of different components, peripherals, and other devices. Preferably, the control system 602 operates under the control of an operating system, such as the WINDOWS operating system developed by Microsoft Corporation or the MACINTOSH operating system developed by Apple Computer Corporation. It should be understood, however, that other operating systems could be utilized to implement the system software 620.

In a preferred embodiment, the control system 602 is connected to the World Wide Web (WWW) W (the "Internet") by any suitable connecting means including, but not limited to, cable or telephone modem, a wired network connection, or a wireless network connection. The connection of the control system 602 to the Internet W facilitates remote control of the controlled motion system 10 as well as for, modifying operation parameters (such as location, speed, the path, etc. of the movers), upgrading control software, and remote process monitoring for maintenance. Information and control updates can be uploaded to the World Wide Web accessible through a conventional secured web site requiring password and/or biometric authentication for login. In operation, It should now be apparent to one skilled in the art that the controlled motion system of the subject application, unlike prior art systems, permits movers to be controlled as they travel along both smart and simple sections or a track, that allows the speed of a mover to be increased or decreased as it travels along a simple section, and permits the pitch or distance between movers to increase or decrease as they travel along a simple section. Further, the controlled motion system of the subject application permits control parameters to be changes as well and monitoring the operation of the system from a remote location, such as a location in another state, country, as well as from other out of site locations.

Preferred embodiments have been disclosed with a certain degree of particularity for the purpose of description, but not of limitation. Those skilled in the art will appreciate that numerous modifications and variations can be made to these embodiments without departing from the spirit and scope of the invention.

We claim:

1. A controlled motion system comprising:
a track having at least one simple section and at least one smart section, wherein said at least one smart section comprising active and reactive elements associated with the at least one smart section and movers and configured for driving and controlling a plurality of movers such that said plurality of movers move independently along the at least one smart section;
at least one motor for moving said movers along said at least one simple section; and
a control system in communication with said at least one motor for controlling the speed of said at least one motor for increasing or decreasing the speed of movers traveling along said at least one simple section.

2. The controlled motion system of claim 1 wherein said control system operates to monitor the position of movers traveling along said at least one simple section using the speed of said at least one motor to calculate the position of said movers.

3. The controlled motion system of claim 1 further comprising at least one encoder in communication with said at least one simple section operable to track said plurality of movers traveling along said at least one simple section.

4. The controlled motion system of claim 1 further comprising at least one photo eye positioned along said at least one simple section and is operable for communicating with said control system to update the position of said movers traveling along said at least one simple section.

5. The controlled motion system of claim 1 wherein said control system operates to stop and start the movement of said movers.

6. The controlled motion system of claim 1 wherein said control system operates to stop and start at least one said mover while not changing the speed of said other movers as they travel along said track.

7. The controlled motion system of claim 1 wherein said at least one simple section comprises at least two simple sections and wherein said control system is in communication with at least one motor such that the speed of movers change as they travel from one simple section to another simple section.

8. The controlled motion system of claim 1 wherein said control system operates to change the pitch between said movers as they travel along said at least one simple section.

9. The controlled motion system of claim 1 further comprising at least one coupling feature having a driving feature on at least one simple section for engaging and operably driving a driven feature on each mover such that positive control of each mover is maintained throughout its transition from a smart section to a simple section.

10. The controlled motion system of claim 1 wherein the at least one smart sections and the at least one simple sections are arranged to create multiple paths so that movers can be independently diverted or merged onto at least one said multiple paths.

11. The controlled motion system of claim 1 wherein said at least one smart section includes at least one nonlinear smart section having a nonlinear shaped stator comprised of a nonlinear shaped core, said core includes a plurality of pole pieces having coils wound around each of said pole pieces and shaped to create a curved shape and wherein said pole pieces are formed from soft magnetic composite materials.

12. The controlled motion system of claim 1 wherein said control system is connected to the Internet for facilitating remote control of the controlled motion system.

13. A controlled motion system comprising:
a track having at least one simple section and at least one smart section, wherein said at least one smart section comprising active and reactive elements associated with the at least one smart section and movers and configured for driving and controlling a plurality of movers such that said plurality of movers move independently along the at least one smart section;
at least one motor for moving said movers along said at least one simple section; and
a control system in communication with said at least one motor for controlling the speed of said at least one motor for increasing or decreasing the speed of movers traveling along said at least one simple section, wherein said control system operates to monitor the position of movers traveling along said at least one simple section using the speed of said at least one motor to calculate the position of said movers, and wherein said control system operates to change the pitch between said movers as they travel along said at least one simple section.

14. The controlled motion system of claim 13 further comprising at least one coupling feature having a driving feature on at least one simple section for engaging and operably driving a driven feature on each mover such that positive control of each mover is maintained throughout its transition from a smart section to a simple section.

15. The controlled motion system of claim 13 wherein the at least one smart sections and the at least one simple sections are arranged to create multiple paths so that movers can be independently diverted or merged onto at least one said multiple paths.

16. The controlled motion system of claim 13 wherein said at least one smart section includes at least one nonlinear smart section having a nonlinear shaped stator comprised of a nonlinear shaped core, said core includes a plurality of pole pieces having coils wound around each of said pole pieces and shaped to create a curved shape and wherein said pole pieces are formed from soft magnetic composite materials.

17. The controlled motion system of claim 13 wherein said control system is connected to the Internet for facilitating remote control of the controlled motion system.

* * * * *